(12) United States Patent
Maniwa et al.

(10) Patent No.: US 8,899,128 B2
(45) Date of Patent: Dec. 2, 2014

(54) STEERING DEVICE

(75) Inventors: Takahiro Maniwa, Gunma-ken (JP);
Norihiko Yokota, Gunma-ken (JP)

(73) Assignee: Yamada Manufacturing Co., Ltd., Kiryu-shi, Gunma-ken (JP)

( * ) Notice: Subject to any disclaimer, the term of this patent is extended or adjusted under 35 U.S.C. 154(b) by 275 days.

(21) Appl. No.: 13/430,571

(22) Filed: Mar. 26, 2012

(65) Prior Publication Data
US 2012/0247258 A1   Oct. 4, 2012

(30) Foreign Application Priority Data

Mar. 28, 2011   (JP) .................................... 2011-69252
Feb. 9, 2012   (JP) .................................... 2012-25879

(51) Int. Cl.
*B62D 1/18*   (2006.01)
*B62D 1/184*   (2006.01)

(52) U.S. Cl.
CPC ..................................... *B62D 1/184* (2013.01)
USPC ......................................... 74/493; 280/775

(58) Field of Classification Search
USPC ..................................... 74/493; 280/775, 777
See application file for complete search history.

(56) References Cited

U.S. PATENT DOCUMENTS

| 5,593,183 A * | 1/1997 | Fouquet et al. ............... 280/775 |
| 5,595,399 A * | 1/1997 | Fouquet et al. ............... 280/777 |
| 6,357,318 B1 * | 3/2002 | Koellisch et al. ............... 74/493 |
| 2006/0028010 A1 | 2/2006 | Yamada |

FOREIGN PATENT DOCUMENTS

JP   2010-105662 A   5/2010

* cited by examiner

*Primary Examiner* — William C Joyce
(74) *Attorney, Agent, or Firm* — McGinn IP Law Group, PLLC (57) ABSTRACT

A steering device includes: an inner column; an outer column that includes a left-right pair of outer column half bodies having holding surface portions formed on respective inner surface sides thereof, the two holding surface portions together constituting a holding inner peripheral surface for holding an outer peripheral surface of the inner column; a pivot bracket in which hanging side portions are formed on either width direction side of a pivot upper portion; a fixing bracket provided with fixing side portions on either width direction side; and a clamping tool. Respective width direction outside surfaces of the two outer column half bodies are sandwiched between the two hanging side portions of the pivot bracket, and the two fixing side portions of the fixing bracket are connected such that the two width direction outside surfaces of the two outer column half bodies can be clamped and released by the clamping tool.

15 Claims, 10 Drawing Sheets

ENLARGED VIEW FROM Y1-Y1

Fig.2A ENLARGED VIEW FROM X1-X1

PARTIAL ENLARGEMENT OF (α)

STEERING DEVICE

BACKGROUND OF THE INVENTION

1. Field of the Invention

The present invention relates to a steering device including a tilt/telescopic adjustment mechanism, with which a clamping condition during tilt/telescopic adjustment can be strengthened and rattling throughout the entire device can be prevented.

2. Description of the Related Art

In Japanese Patent Application Publication No. 2010-105662, a left/right pair of clamp members 8A, 8B molded from an aluminum alloy or a magnesium alloy using a die casting method are sandwiched to be capable of telescopic movement and tilting movement between inner peripheral surfaces 321A, 321B of left and right side plates 32A, 32B of an upper side vehicle body attachment bracket 3, and arc-shaped inner peripheral surfaces 82A, 82B formed on respective inner sides of the clamp members 8A, 8B surround and hold an outer periphery 11 of an outer column 1 (see (2) of FIG. 2 and FIG. 3 in Japanese Patent Application Publication No. 2010-105662).

Rectangular engagement projections 83A, 83B that are long in an axial direction are formed integrally with the arc-shaped inner peripheral surfaces 82A, 82B on a horizontal line passing through a center axis line of the outer column 1. Engagement recesses 12A, 12B are formed in the outer periphery 11 of the outer column 1 to penetrate an inner periphery 13, and the engagement projections 83A, 83B of the clamp members 8A, 8B are fitted into the engagement recesses 12A, 12B.

A cylindrical bush 22 molded using a material having a small frictional coefficient is fitted to the inner periphery 13 of the outer column 1, and the engagement projections 83A, 83B of the clamp members 8A, 8B are fitted into engagement recesses 23A, 23B formed in an outer periphery of the bush 22. An inner column 2 is fitted to an inner periphery of the bush 22 to be capable of sliding in the axial direction.

By engaging the engagement projections 83A, 83B with the engagement recesses 12A, 12B, 23A, 23B, the outer column 1 and the bush 22 are prevented from rotating relative to the clamp members 8A, 8B, and when a telescopic position of the outer column 1 is adjusted relative to the inner column 2, the outer column 1, clamp members 8A, 8B, and bush 22 are allowed to slide integrally in the axial direction.

Telescopic elongated grooves 81A, 81B that are long in the axial direction are formed below the clamp members 8A, 8B, and a clamping rod 34 is inserted into tilt elongated grooves 33A, 33B formed in the side plates 32A, 32B and the telescopic elongated grooves 81A, 81B. Slits 14, 24 are formed respectively in the outer column 1 and a lower surface of the bush 22, and when the clamp members 8A, 8B are clamped, the outer column 1 and the bush 22 are reduced in diameter such that the inner column 2 is held thereby.

Further, columnar engagement projections 84A, 84B, 84C are formed above and below the arc-shaped inner peripheral surface 82B of the clamp member 8B. The columnar engagement projections 84A, 84B, 84C are engaged with circular engagement recesses, not shown in the drawings, formed in the outer column 1, thereby fixing the clamp member 8B to the outer column 1 so that the outer column 1 is prevented from rotating (see (2) of FIG. 2 in Japanese Patent Application Publication No. 2010-105662).

Furthermore, engagement recesses 27A, 27B are formed in an outer periphery 25 of the inner column 2, and by bringing axial direction end portions of the rectangular engagement projections 83A, 83B that are formed on the inner periphery 13 of the outer column 1 to be long in the axial direction into contact with axial direction end portions of the engagement recesses 27A, 27B, the engaged components function as a stopper during telescopic adjustment (see FIGS. 4 and 5 in Japanese Patent Application Publication No. 2010-105662).

The outer periphery 25 of the inner column 2 is fitted to the inner periphery 13 of the outer column 1 to be capable of sliding in the axial direction, and the engagement projections 83A, 83B of the clamp members 8A, 8B are fitted into the engagement recesses 27A, 27B formed in the outer periphery 25 of the inner column 2. An axial direction length L1 of the engagement recesses 27A, 27B is set at a length obtained by adding a telescopic adjustment distance of the outer column 1 to an axial direction length L2 of the engagement projections 83A, 83B of the clamp members 8A, 8B.

By engaging the engagement projections 83A, 83B with the engagement recesses 12A, 12B, 27A, 27B, the outer column 1 and the inner column 2 are prevented from rotating relative to the clamp members 8A, 8B, and when the telescopic position of the outer column 1 is adjusted relative to the inner column 2, the outer column 1 and the clamp members 8A, 8B are allowed to slide integrally in the axial direction.

The following problems exist in Japanese Patent Application Publication No. 2010-105662. When an operating lever 349 is rotated, an interval between the side plates 32A, 32B narrows, causing the clamp members 8A, 8B to rotate such that a lower interval between the clamp members 8A, 8B narrows while an upper interval widens. As a result, the outer column 1 is clamped by the clamp members 8A, 8B unevenly, and therefore a stable clamping condition cannot be obtained.

To prevent the clamp members 8A, 8B from rotating, the engagement projections 83A, 83B are formed on the clamp members 8A, 8B and engaged with the engagement recesses 12A, 12B of the outer column 1 fixedly. With this configuration, however, dimension management is difficult, leading to an increase in cost. Moreover, when dimensional irregularities arise, rattling may occur, and therefore problems remain.

Further, the clamp members 8A, 8B are latched and fixed to the outer column 1 separately from the left and the right, and therefore the left and right clamp members 8A and 8B may rotate or twist differently during clamping, leading to a reduction in clamping force.

Furthermore, to prevent the clamp members 8A, 8B from rotating and twisting, the columnar engagement projections 84A, 84B, 84C formed respectively on the clamp members 8A, 8B are engaged with the circular engagement recesses, not shown in the drawings, formed in the outer column 1. As a result, however, increases in structural complexity and processing cost occur. Moreover, the outer column 1 and the clamp members 8A, 8B are provided as separate members, leading to an increase in a number of components.

Further, a stopper for use during a telescopic operation is formed by engaging the rectangular engagement projections 83A, 83B that are formed on the clamp members 8A, 8B to be long in the axial direction with the engagement recesses 27A, 27B formed in the inner column 2, and therefore the axial direction length of the engagement recesses 27A, 27B must be set at a length obtained by adding the telescopic adjustment distance to the axial direction length of the engagement projections 83A, 83B. As a result, the length of the inner column 2 also increases, leading to an increase in the overall size of the steering device.

SUMMARY OF THE INVENTION

Furthermore, dimension management of the engagement projections 83A, 83B, the engagement recesses 12A, 12B in the outer column 1, and the engagement recesses 27A, 27B in the inner column 2 is difficult, and therefore a further cost increase occurs. When dimensional irregularities arise, the clamp members 8A, 8B may rotate and rattle, leading to deterioration of the telescopic operation. An object (technical object) of the present invention is therefore to provide a steering device with which a clamping condition can be balanced favorably and strengthened during tilt/telescopic adjustment, and rattling throughout the entire device can be prevented.

As a result of committed research undertaken with the aim of solving the problems described above, the inventor solved these problems by providing, as a first invention, a steering device including: an inner column; an outer column that includes a left-right pair of outer column half bodies having holding surface portions formed on respective inner surface sides thereof, the two holding surface portions constituting a holding inner peripheral surface for holding an outer peripheral surface of the inner column; a pivot bracket in which hanging side portions are formed on either width direction side of a pivot upper portion; a fixing bracket provided with fixing side portions on either width direction side; and a clamping tool, wherein respective width direction outside surfaces of the two outer column half bodies are sandwiched between the two hanging side portions of the pivot bracket, and the two fixing side portions of the fixing bracket are connected such that the two width direction outside surfaces of the two outer column half bodies can be clamped and released by the clamping tool.

A second invention solves the problems described above by providing the steering device according to the first invention, wherein each of the hanging side portions is constituted by a pivot side portion and a rear extension side portion that projects to a rear side from the pivot side portion, the outside surfaces of the two outer column half bodies each include an upper portion contact surface formed in a position corresponding to a diametrical center of the held inner column so as to extend in an axial direction, and a lower portion contact surface formed below the upper portion contact surface, the two upper portion contact surfaces are sandwiched fixedly between the two rear extension side portions of the pivot bracket, the two rear extension side portions are sandwiched between the two fixing side portions of the fixing bracket, and the two fixing side portions are connected to the two lower portion contact surfaces such that the two lower portion contact surfaces can be clamped and released via the clamping tool.

A third invention solves the problems described above by providing the steering device according to the first or second invention, wherein the lower portion contact surface is formed to project further outward in the width direction than the upper portion contact surface via a step portion, and a width direction dimension of the step portion is formed to be equal to or smaller than a thickness dimension of the rear extension side portion of the pivot bracket. A fourth invention solves the problems described above by providing the steering device according to any one of the first, second, and third inventions, wherein a groove-shaped recessed portion is formed in an up-down direction intermediate location in the holding inner peripheral surface of the outer column so as to extend in an axial direction.

A fifth invention solves the problems described above by providing the steering device according to any one of the first, second, third, and fourth inventions, wherein a knock pin is inserted fixedly into the upper portion contact surface of the outer column and the rear extension side portion of the pivot bracket, and a telescopic elongated hole for inserting the knock pin is formed in the inner column so as to extend in an axial direction.

A sixth invention solves the problems described above by providing the steering device according to any one of the first, second, third, fourth, and fifth inventions, wherein each of the holding surface portions is formed in a semicircular shape such that the two holding surface portions together constitute a circular-shaped holding inner peripheral surface. A seventh invention solves the problems described above by providing the steering device according to any one of the first, second, third, fourth, and fifth inventions, wherein each of the holding surface portions is formed in a polygonal surface shape such that the two holding surface portions together constitute a polygonal holding inner peripheral surface.

An eighth invention solves the problems described above by providing the steering device according to any one of the first, second, third, fourth, fifth, sixth, and seventh inventions, wherein the pivot upper portion of the pivot bracket contacts an upper end of each of the two outer column half bodies. A ninth invention solves the problems described above by providing the steering device according to any one of the first, second, third, fourth, fifth, sixth, seventh, and eighth inventions, wherein the two outer column half bodies are made of an aluminum alloy.

In the first invention, the outer column is constituted by the two outer column half bodies forming a left-right pair, and therefore, during clamping by the clamping tool, a location in which the inner column is pressed can be specified such that an even pressing force is applied from either width direction side. As a result, a stable clamping condition can be realized. Further, when the clamp applied by the clamping tool is released, the clamp applied by the two hanging side portions of the pivot bracket is loosened such that the outer column half bodies are separated from each other smoothly, and therefore the clamp on the inner column can be released smoothly.

In the second invention, the rear extension side portion of the pivot bracket fixedly contacts the upper portion contact surface formed on the outer surface on either width direction side of the outer column, while the fixing bracket sandwiches the two rear extension side portions and the two lower portion contact surfaces of the outer column using the two fixing side portions and connects these components so that the components can be clamped and released via the clamping tool. In other words, the outer column and the pivot bracket are clamped integrally, and therefore the inner column can be clamped fixedly by the upper portion contact surfaces and lower portion contact surfaces of the outer column, leading to an improvement in clamping rigidity.

In the third invention, the width direction dimension of the step portion formed between the upper portion contact surface and the lower portion contact surface is set to be equal to or smaller than the thickness dimension of the rear extension side portion, and therefore, during clamping, the two fixing side portions of the fixing bracket come into contact with the two rear extension side portions of the pivot bracket first such that the upper portion contact surfaces are pressed thereby. Thus, the outer column can be prevented from twisting. Further, the inner column is pressed from the upper portion contact surface of the outer column, which is provided in a position corresponding to a horizontal diameter line passing through the diametrical center, and therefore the inner column receives an even pressing force from the holding inner peripheral surface of the outer column. As a result, the clamping rigidity can be improved and rattling can be prevented.

In the fourth invention, the groove-shaped recessed portion is formed in an up-down direction intermediate location in the holding inner peripheral surface of the outer column so as to extend in an axial direction, and therefore the clamping force from the upper portion contact surface is dispersed evenly between the holding inner peripheral surface in a region above the recessed portion and the holding inner peripheral surface in a region below the recessed portion. As a result, rotation and twisting of the outer column during clamping can be suppressed, and rattling can be prevented.

In the fifth invention, the knock pin inserted fixedly into the upper portion contact surface of the outer column and the rear extension side portion of the pivot bracket penetrates the telescopic elongated hole formed in the inner column. Therefore, rotation of the inner column relative to the outer column can be restricted, and rattling in the up-down direction can be prevented. Moreover, the knock pin serves as a stroke stopper during telescopic adjustment.

In the sixth invention, each of the holding surface portions is formed in a semicircular shape such that the two holding surface portions together constitute a circular-shaped holding inner peripheral surface. Hence, the two holding surface portions and the inner column contact each other substantially in a state of surface contact such that when clamping is performed by the clamping tool, the inner column can be supported and fixed extremely forcefully. In the seventh invention, each of the holding surface portions is formed in a polygonal surface shape such that the two holding surface portions together constitute a polygonal holding inner peripheral surface. Hence, the two holding surface portions and the inner column contact each other in line contact in a plurality of locations, and therefore the inner column can be supported in an extremely stable condition.

In the eighth invention, the pivot upper portion of the pivot bracket contacts an upper end of each of the two outer column half bodies, and therefore, when clamping is performed by the clamping tool, the outer column half bodies can be prevented from rotating and the inner column can be clamped with stability by an even pressing force from either width direction side. In the ninth invention, the two outer column half bodies are made of an aluminum alloy and are therefore lightweight and easy to process. Further, only a single die is required for the outer column half bodies, and therefore a reduction in cost can be achieved.

DESCRIPTION OF THE PREFERRED EMBODIMENTS

Embodiments of the present invention will be described below on the basis of the drawings. Note that in the following description of the present invention, a front-rear direction is set such that when the steering device according to the present invention is mounted in an automobile, a side corresponding to a front of the automobile is assumed to be a "front side" and a side corresponding to a rear of the automobile is assumed to be a "rear side", using a front-rear direction of the automobile as a reference. Further, a direction linking the front side to the rear side will be referred to as an "axial direction". Furthermore, a "width direction" indicates a left-right direction of the automobile.

Figure 1A:
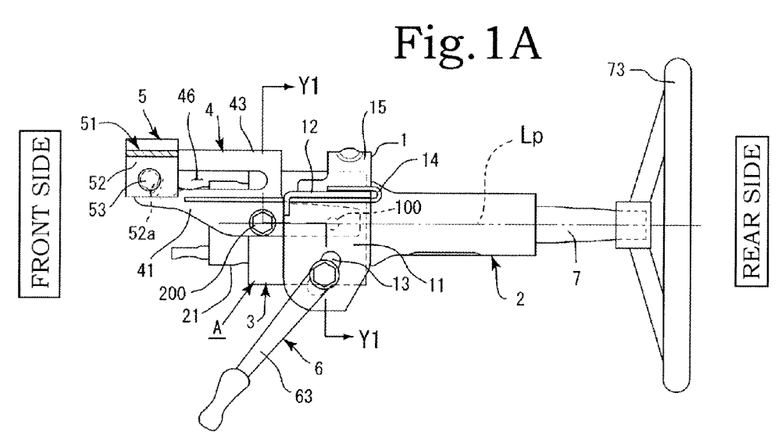
FIG. 1A is a side view showing an embodiment of the present invention using a short type outer column half body and a short type pivot bracket.
Figure 1B:
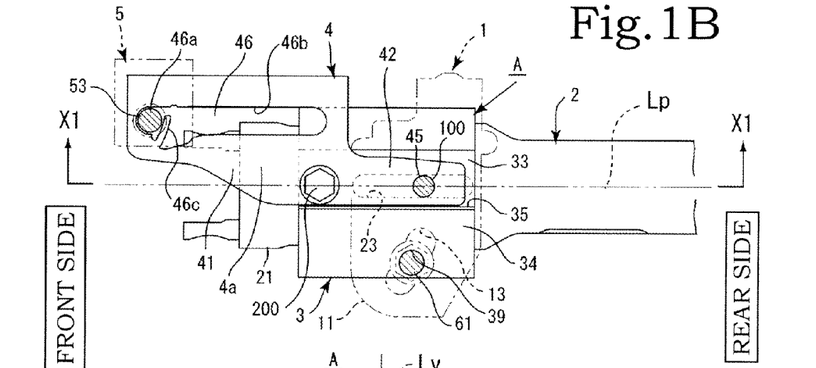
FIG. 1B is an enlarged side view showing main parts of the present invention excluding a fixing bracket.
Figure 1C:
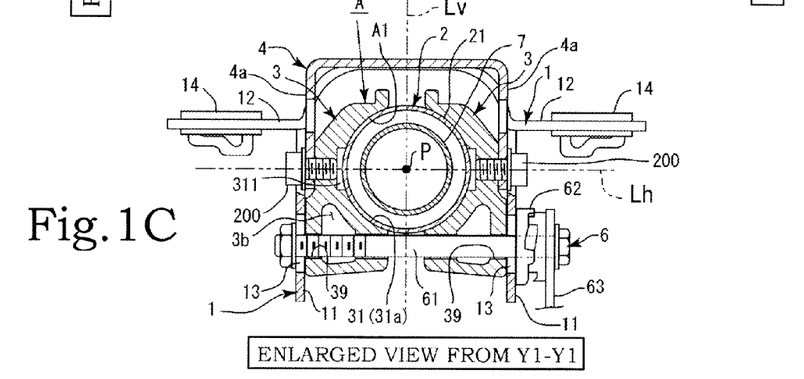
FIG. 1C is a sectional view taken along an arrow Y1-Y1 in FIG. 1A.
Figure 2A:
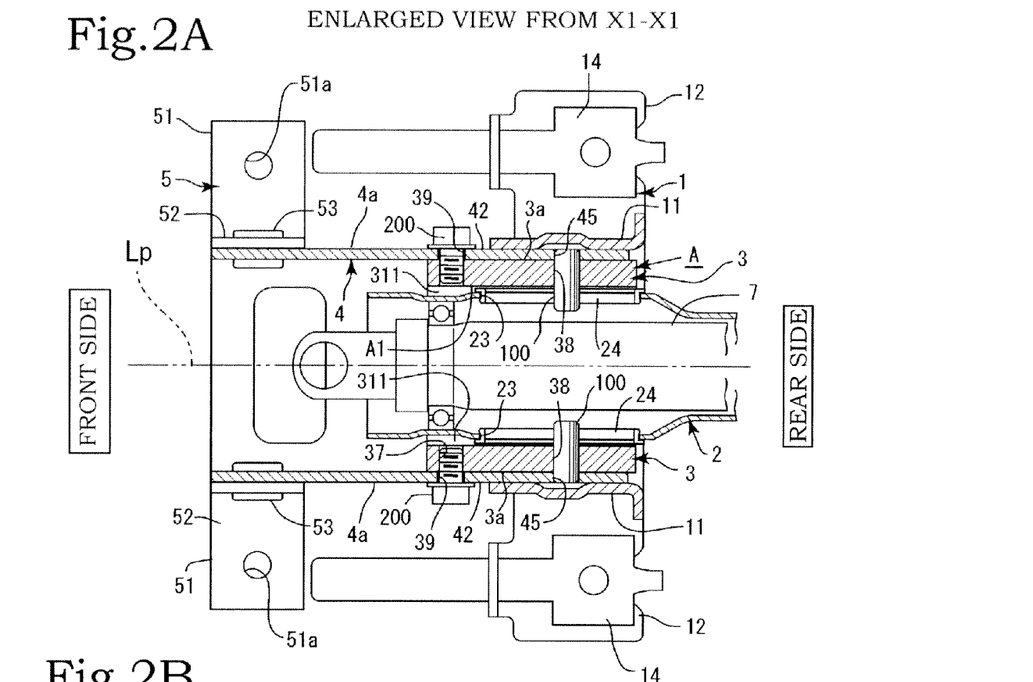
FIG. 2A is a sectional view taken along an arrow X1-X1 in FIG. 1B in a condition where the fixing bracket is provided.
Figure 2B:
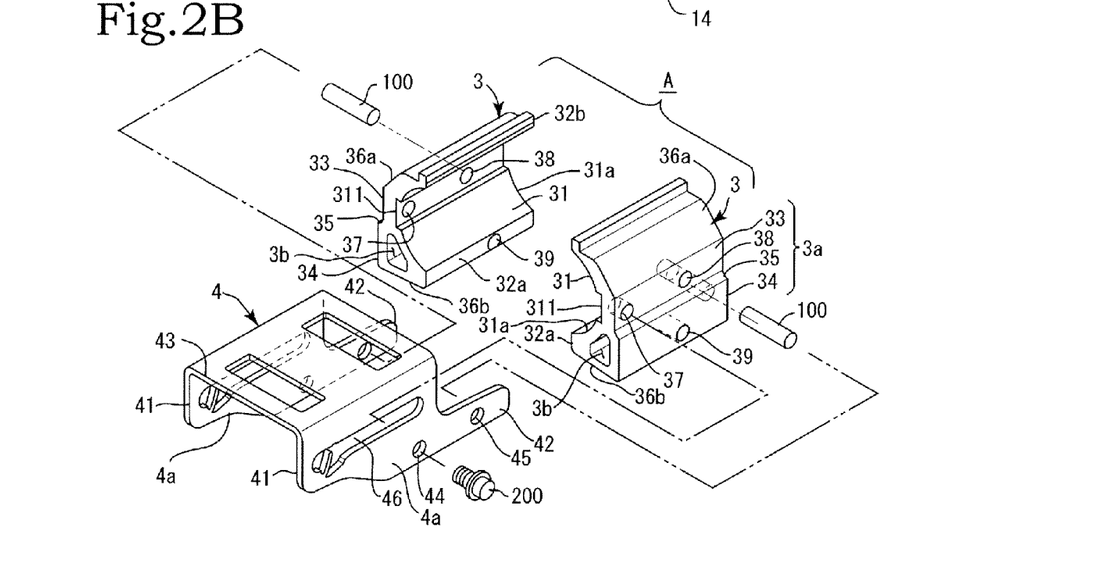
FIG. 2B is an exploded perspective view of the short type outer column half bodies and the short type pivot bracket.
Figure 3A:
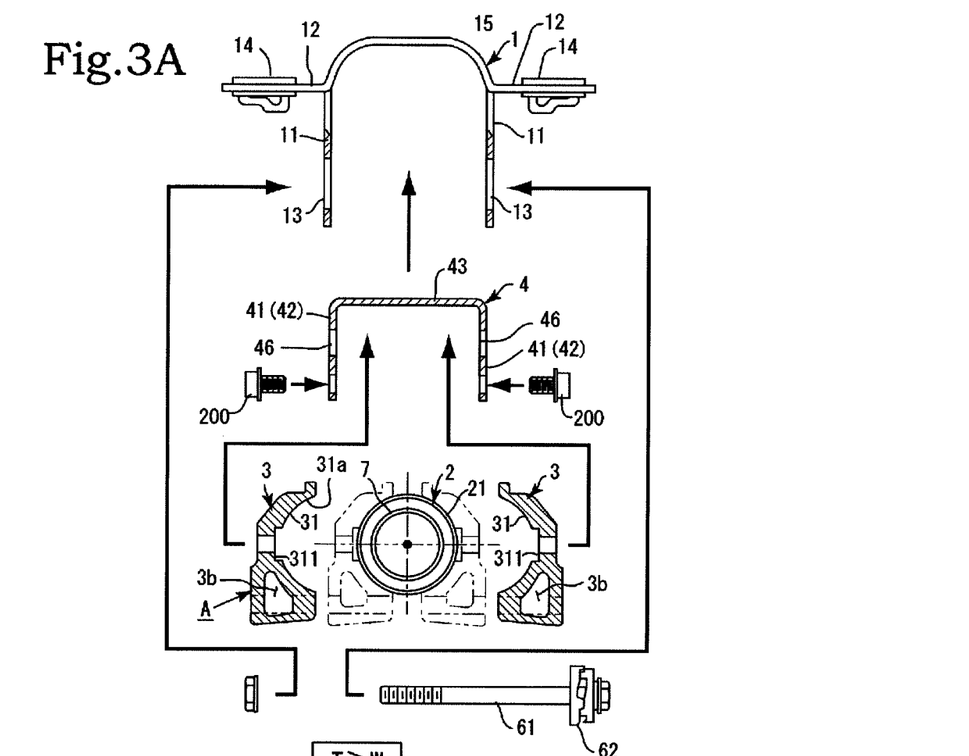
FIG. 3A is an exploded view showing a partial cross-section of a constitution of the present invention.
Figure 3B:
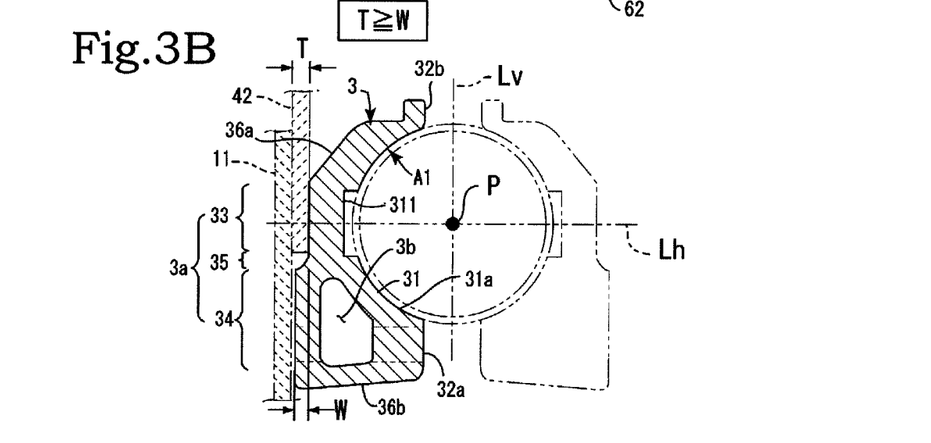
FIG. 3B is a longitudinal sectional front view of the outer column half body.

As shown in FIGS. 1 to 3, the present invention is principally constituted by a fixing bracket 1, an inner column 2, an outer column A, a pivot bracket 4, a clamping tool 6, and so on. The fixing bracket 1 is constituted by fixing side portions 11 and attachment portions 12 formed on respective width direction sides, and a connecting portion 15. The attachment portions 12 are formed to extend horizontally outward from upper ends of the respective fixing side portions 11, and the attachment portions 12 are connected by the connecting portion 15 to form an integral structure.

A tilt adjustment elongated hole 13 for use during tilt adjustment is formed in the fixing side portion 11 such that a lengthwise direction thereof corresponds to an up-down direction or a longitudinal direction (see FIGS. 1A, 1C, and 3). A capsule member 14 is mounted on each attachment portion 12, and the fixing bracket 1 is mounted in a predetermined location of a vehicle body via the two capsule members 14 (see FIGS. 1A and 2A).

The inner column 2 is a hollow cylindrical pipe. A steering shaft 7 is mounted in an interior of the inner column 2, and a steering wheel 73 is mounted on a rear side end portion of the steering shaft 7 (see FIG. 1A). A held cylindrical portion 21 is formed on the inner column 2. The held cylindrical portion 21 is a cylindrical region of the inner column 2 having a maximum diameter, which is supported by the outer column A, as will be described below (see FIGS. 1C, 3, 5A, and so on).

Figure 5A:
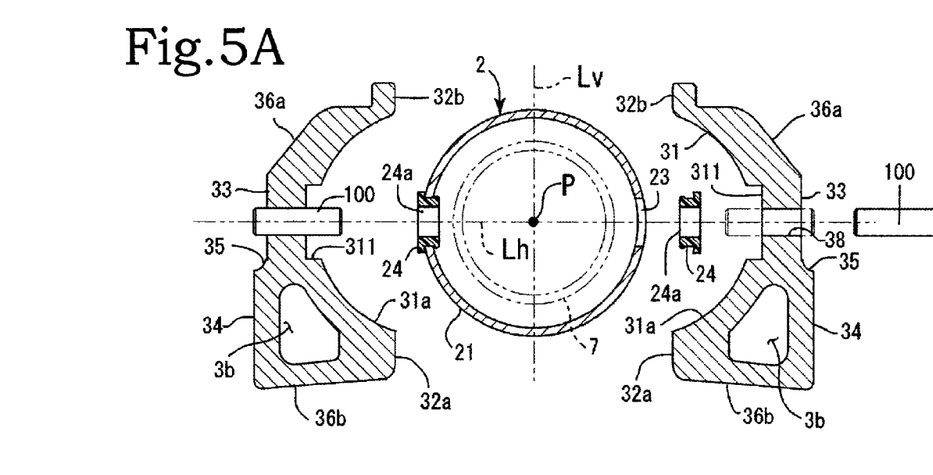
FIG. 5A is an exploded longitudinal sectional front view showing a constitution of a telescopic elongated hole formed in an inner column and a knock pin in a telescopic adjustment mechanism.
Figure 5B:
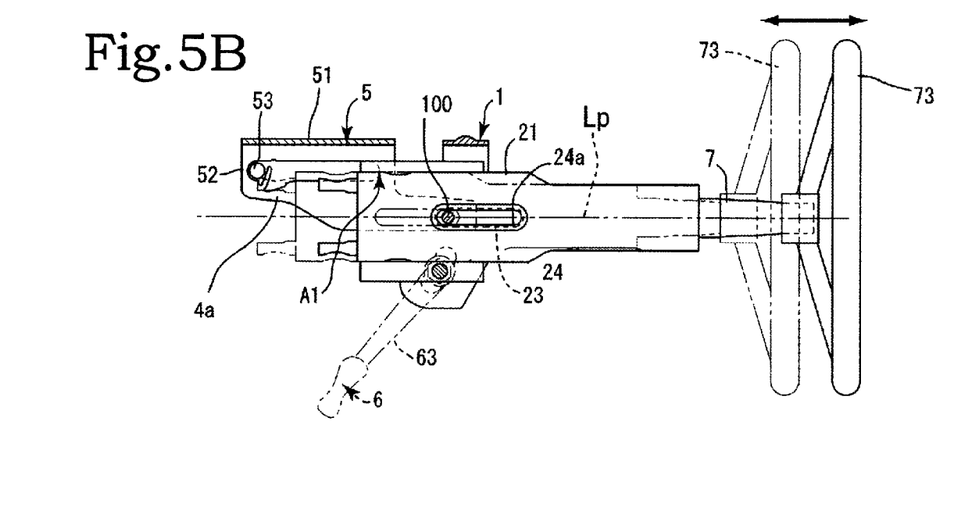
FIG. 5B is a schematic view showing telescopic adjustment.

A telescopic elongated hole 23 having a lengthwise direction that corresponds to the axial direction is formed in the held cylindrical portion 21 on either width direction side (see FIGS. 1B, 2A, and 5B). A slide guide 24 to be described below is mounted in the telescopic elongated hole 23. Further, according to the present invention, a diametrical center of the inner column 2 is set as P, an imaginary line extending in the axial direction from the diametrical center P is set as an axial centerline Lp, a horizontal direction line passing through the axial center P is set as a horizontal diameter line Lh, and a vertical direction line passing through the axial center P is set as a vertical diameter line Lv (see FIG. 1).

The outer column A includes a holding inner peripheral surface A1 that holds the held cylindrical portion 21 of the inner column 2 to enable telescopic adjustment thereof. The holding inner peripheral surface A1 is formed at a constant diameter in the axial direction. The outer column A is constituted by a pair of outer column half bodies 3 (see FIGS. 10, 2, and 3). The two outer column half bodies 3 are disposed to face each other in left-right symmetry and shaped identically. Each outer column half body 3 is formed from an aluminum alloy through casting, extrusion molding, or similar.

As will be described below, the outer column half body 3 exists in a short type (see FIG. 2) and a long type (see FIG. 8). The short type and the long type differ from each other in a front-rear direction length dimension. The short type and long type outer column half bodies 3 are substantially identical to each other in their basic structures, and therefore the following description will focus on the short type outer column half body 3, with the long type described later. Opposing sides of the two outer column half bodies 3 are set as inner sides, while outer peripheral parts other than the inner sides are set as outer sides.

A holding surface portion 31 constituting the holding inner peripheral surface A1 is formed on the inner side of each outer column half body 3. The holding surface portion 31 exists in a plurality of types having different shapes. A first type of the holding surface portion 31 is formed as a substantially semicircular indented part, and this type will be referred to as a semicircular surface portion 31a (see FIGS. 1C, 2B, 3, and so on). A second type of the holding surface portion 31 is formed as a substantially polygonal surface-shaped indented part, and this type will be referred to as a polygonal surface portion 31b (see FIG. 10C).

When the holding surface portion 31 is constituted by the semicircular surface portion 31a and the pair of outer column half bodies 3 are disposed in left-right symmetry, the two holding surface portions 31 together form the holding inner peripheral surface A1 having a through hole with a circular cross-section that penetrates in the axial direction, and the held cylindrical portion 21 of the inner column 2 is held thereby (see FIGS. 1C and 3).

Further, when the holding surface portion 31 is constituted by the polygonal surface portion 31b, the two holding surface portions 31 together form the holding inner peripheral surface A1 having a through hole with a polygonal cross-section that penetrates in the axial direction, and the held cylindrical portion 21 of the inner column 2 is held thereby. With the holding inner peripheral surface A1 constituted by the holding surface portion 31 of the first type (the semicircular surface portion 31a), the held cylindrical portion 21 of the inner column 2 is held substantially in a state of surface contact, and therefore an axial direction holding force can be strengthened.

Figure 10A:
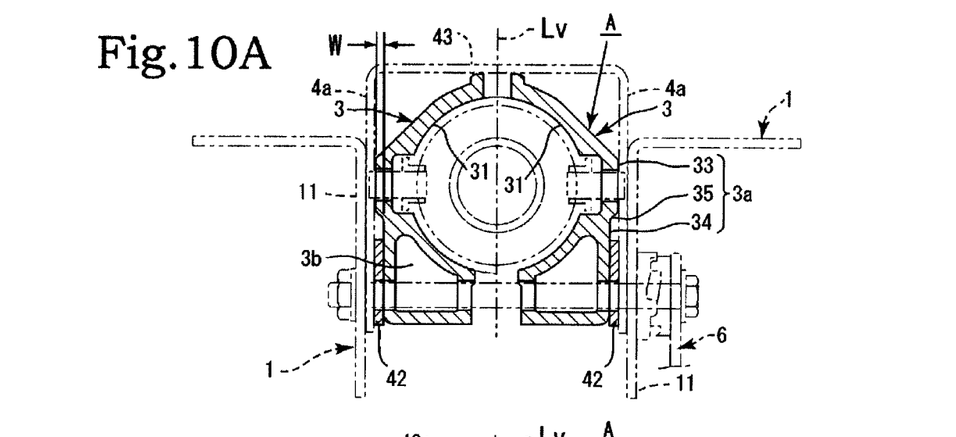
FIG. 10A is a longitudinal sectional front view of an outer column half body having a side face on which an upper portion contact surface projects further outward in a width direction than a lower portion contact surface.
Figure 10B:
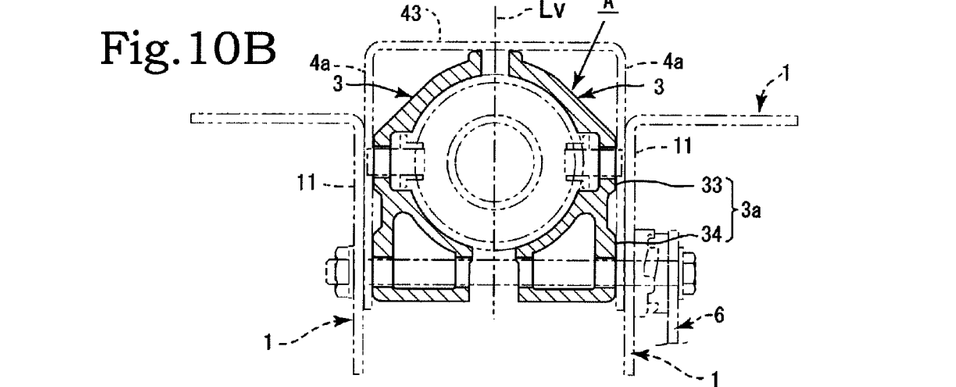
FIG. 10B is a longitudinal sectional front view of an outer column half body having an outside surface on which the upper portion contact surface and the lower portion contact surface are coplanar.
Figure 10C:
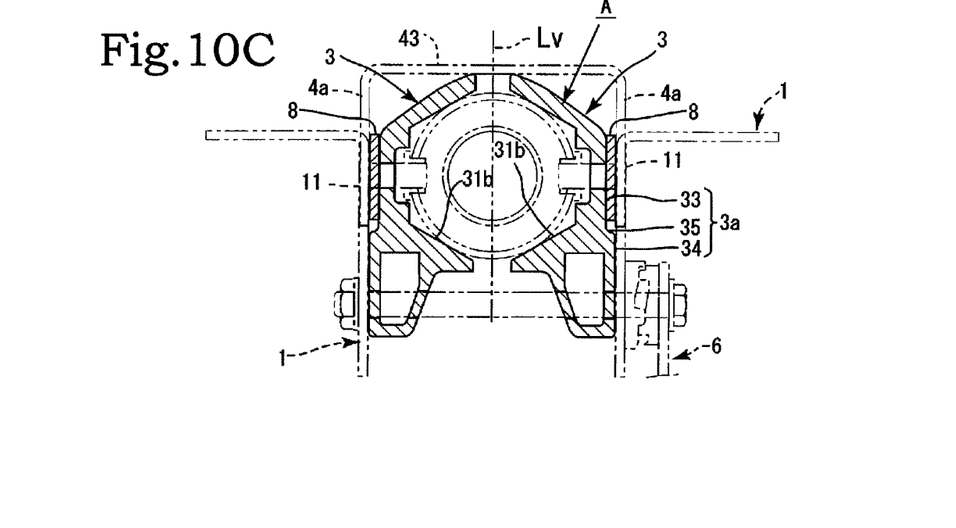
FIG. 10C is a longitudinal sectional front view showing an embodiment in which a holding surface portion of the outer column half body is a polygonal surface portion.

With the holding inner peripheral surface A1 constituted by the holding surface portion 31 formed from the polygonal surface portion 31b, the held cylindrical portion 21 of the inner column 2 is held substantially in a state of line contact, and therefore partial contact is realized in a plurality of locations such that the inner column 2 can be held in a stable condition (see FIG. 10C). Furthermore, the polygonal surface portion 31b is constituted by two or more flat surfaces, and in a particularly favorable embodiment, the polygonal surface portion 31b has three surfaces (see FIG. 10C). In this case, the holding inner peripheral surface A1 can be formed with a substantially hexagonal cross-section from the two holding semicircular portions 31, and as a result, the inner column 2 can be held in an extremely stable condition.

A recessed portion 311 is formed in a central position of the holding surface portion 31 in the up-down direction so as to extend in the axial direction. The recessed portion 311 is formed as a groove having a square cross-section, into which the slide guide 24 is inserted with play. In a condition where the held cylindrical portion 21 of the inner column 2 is held appropriately by the two outer column half bodies 3, the recessed portion 311 is formed in a position corresponding to the horizontal diameter line Lh of the inner column 2 (see FIG. 1C).

Further, on the inner side of the outer column half body 3, a surface on a lower side of the holding surface portion 31 will be referred to as a lower portion inside surface 32a and a surface on an upper side of the holding surface portion 31 will be referred to as an upper portion inside surface 32b (see FIG. 2B). The lower portion inside surface 32a and the upper portion inside surface 32b are formed as vertical flat surfaces. When the pair of outer column half bodies 3 are disposed in left-right symmetry to form the outer column A and the held cylindrical portion 21 of the inner column 2 is sandwiched between the two outer column half bodies 3, appropriate intervals are formed respectively between the two lower portion inside surfaces 32a and the two upper portion inside surfaces 32b (see FIG. 1C).

An outer side of the outer column half body 3 is constituted by an outside surface 3a, an upper surface portion 36a, and a bottom surface portion 36b. The outside surface 3a is constituted by an upper portion contact surface 33, a lower portion contact surface 34, and a step portion 35. The step portion 35 is formed at a boundary between the lower portion contact surface 34 and the upper portion contact surface 33 (see FIG. 2B). The outside surface 3a of the outer column half body 3 may be provided on the outer column half body 3 in three types, depending on whether one of the upper portion contact surface 33 and the lower portion contact surface 34 projects further outward in the width direction of the outer column half body 3 than the other or the upper portion contact surface 33 and the lower portion contact surface 34 are coplanar.

A first type of the outside surface 3a is formed such that the lower portion contact surface 34 projects further outward in the width direction of the outer column half body 3 than the upper portion contact surface 33 via the step portion 35 (see FIGS. 1C, 2B, 3, and so on). More specifically, a width direction dimension W of the step portion 35 is formed to be equal to or smaller than a thickness dimension T of a rear extension side portion of a hanging side portion 4a of the pivot bracket 4, to be described below. The step portion 35 is formed to project from a lower end of the upper portion contact surface 33 (see FIGS. 3B and 4B).

A second type of the outside surface 3a of the outer column half body 3 is formed such that the upper portion contact surface 33 projects further outward in the width direction of the outer column half body 3 than the lower portion contact surface 34 via the step portion 35 (see FIG. 10A). A third type of the outside surface 3a of the outer column half body 3 is formed such that the upper portion contact surface 33 and the lower portion contact surface 34 are coplanar on the width direction outer side of the outer column half body 3.

To describe this in further detail, the upper portion contact surface 33 is a substantially rectangular vertical flat surface formed in a position corresponding to an intermediate location in the up-down direction relative to the holding surface portion 31. The upper portion contact surface 33 of the outer column half body 3 is a flat surface which, when the held cylindrical portion 21 of the inner column 2 is held appropriately by the two outer column half bodies 3, is orthogonal (or substantially orthogonal) to the horizontal diameter line Lh of the inner column 2 and extends substantially evenly in the up-down direction from an intersection position with the horizontal diameter line Lh (see FIG. 3B).

The lower portion contact surface 34 is a substantially rectangular vertical flat surface provided below the upper portion contact surface 33 and parallel to the upper portion contact surface 33. A screw hole 37 is formed in the upper portion contact surface 33, and the screw hole 37 is used together with a fixing bolt 200 to connect and fix the pivot bracket 4. Further, a knock pin attachment hole 38 that penetrates the holding surface portion 31 and the upper portion contact surface 33 is formed in the outer column half body 3 (see FIGS. 2 and 5A). A knock pin 100 is press-fitted into the knock pin attachment hole 38. A clamping bolt shaft insertion hole 39 that is penetrated by a bolt shaft 61 of the clamping tool 6, to be described below, is formed in the lower portion contact surface 34. The clamping bolt shaft insertion hole 39 penetrates the outer side lower portion contact surface 34 and the inner side lower portion inside surface 32a (see FIG. 2B).

Figure 8A:
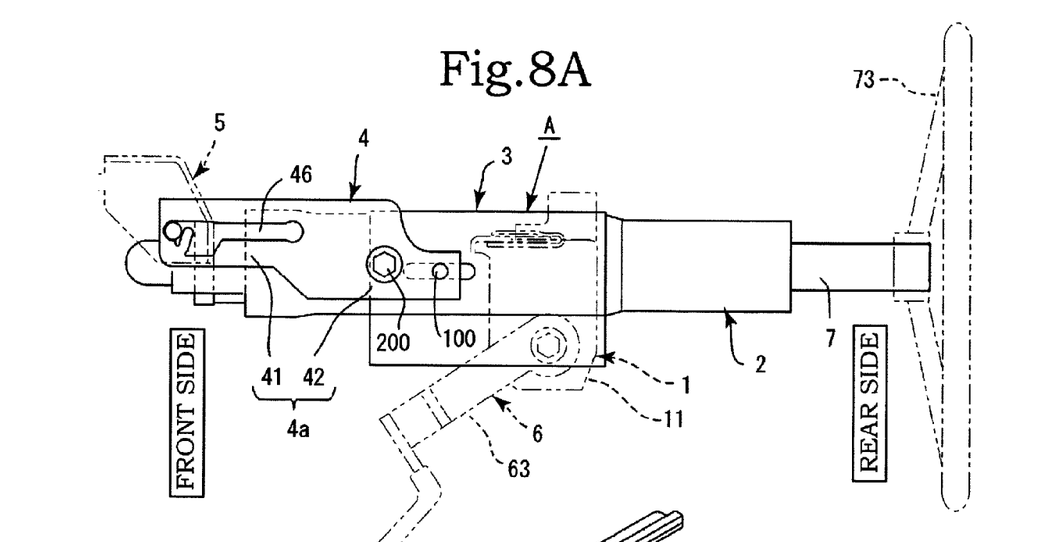
FIG. 8A is a side view showing an embodiment of the present invention using a long type outer column half body and a short type pivot bracket and excluding the fixing bracket.
Figure 8B:
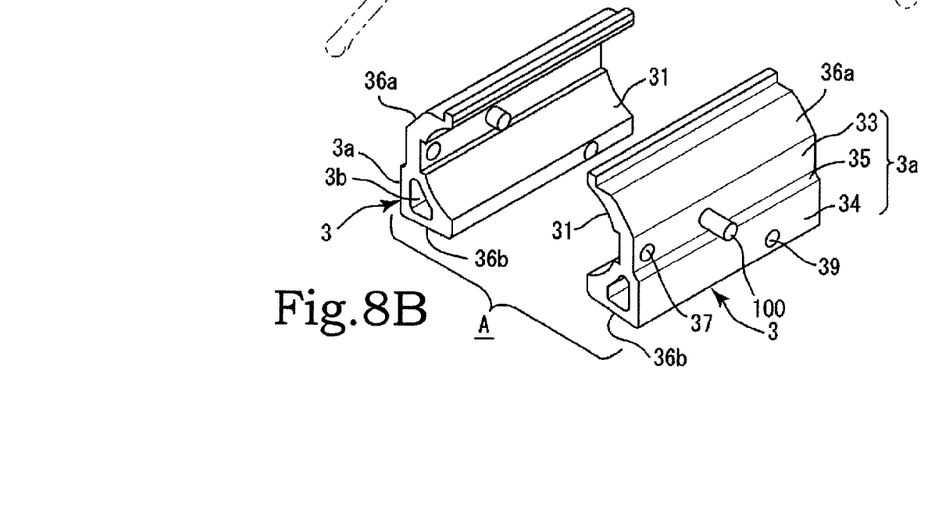
FIG. 8B is a perspective view of the long type outer column half body.

Furthermore, the long type outer column half body 3 has a greater front-rear direction length dimension than the short type, but is otherwise constituted identically to the short type (see FIG. 8). More specifically, using the clamping bolt shaft insertion hole 39 for connecting the fixing bracket 1 as a reference position, the outer column half body 3 extends toward the front side of the vehicle body from the position of the clamping bolt shaft insertion hole 39. Hence, a front-rear direction interval between the clamping bolt shaft insertion hole 39 and the screw hole 37 of the outer column half body 3, or a front-rear direction interval between the clamping bolt shaft insertion hole 39 and the knock pin attachment hole 38, is greater in the long type than in the short type.

As will be described below, the pivot bracket 4 also exists in a short type (see FIGS. 1B, 2B, and so on) and a long type. The short type and the long type differ from each other in a front-rear direction length dimension. The short type and long type pivot brackets 4 are substantially identical to each other in their basic structures, and therefore the following description will focus on the short type pivot bracket 4, with the long type described later.

The hanging side portions 4a are formed on either width direction side of a pivot upper portion 43 of the pivot bracket 4. The hanging side portion 4a is constituted by a pivot side portion 41 and the rear extension side portion 42, the pivot side portion 41 being formed on the vehicle body front side and the rear extension side portion 42 being formed integrally with the pivot side portion 41 on the vehicle body rear side (see FIGS. 1, 2, and 9B). Upper ends of the respective pivot side portions 41 are connected by the pivot upper portion 43 to form an integral structure, and the rear extension side portion 42 is formed integrally therewith so as to project toward the rear side from the pivot side portion 41 (see FIGS. 1, 2, and so on).

Figure 9A:
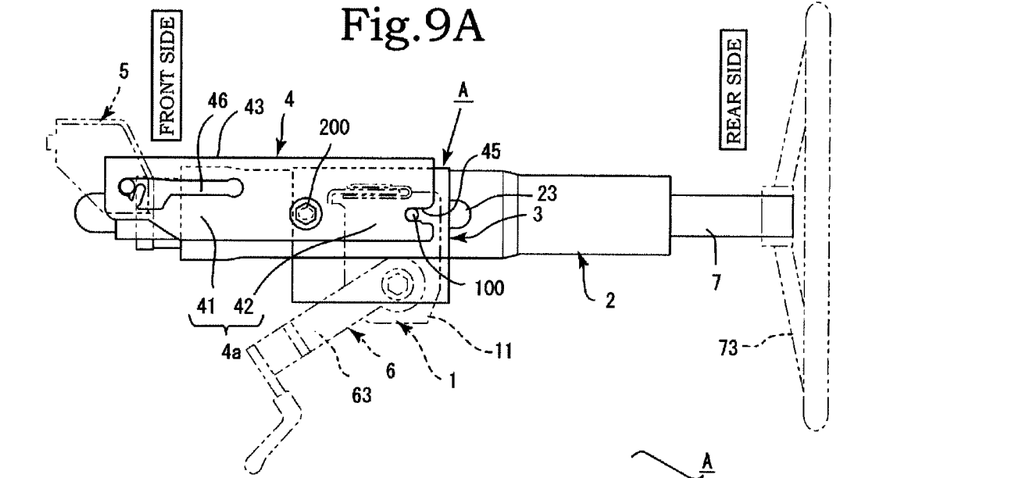
FIG. 9A is a side view showing an embodiment of the present invention using the short type outer column half body and a long type pivot bracket and excluding the fixing bracket.
Figure 9B:
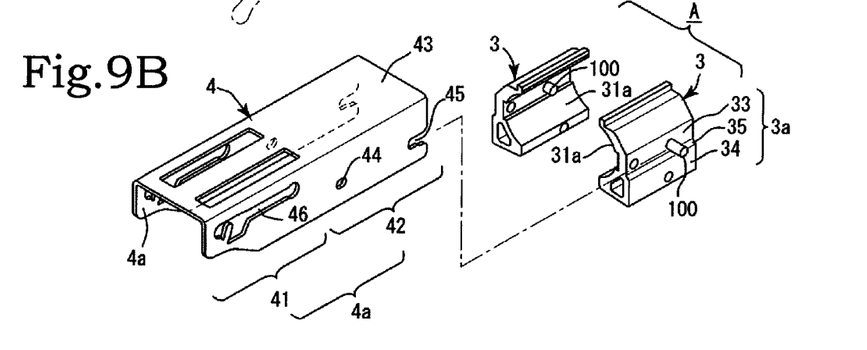
FIG. 9B is a perspective view showing the long type pivot bracket and the short type outer column half body in a separated condition.

The pivot upper portion 43 may be formed over the entirety of the front-rear direction of the hanging side portions 4a, or in other words the pivot side portion 41 and the rear extension side portion 42 (see FIG. 9B). In this case, the pivot bracket 4 is formed with a substantially archway-shaped cross-section extending from front to rear in the front-rear direction. The rear extension side portion 42 is a site that contacts the outside surface 3a of the outer column 3, and mainly contacts the upper portion contact surface 33. The rear extension side portion 42 may be formed in a shape that is slightly smaller than a region of the upper portion contact surface 33.

An elongated hole portion 46 is formed in an upper portion of the pivot side portion 41 so as to extend in the axial direction. The elongated hole portion 46 is constituted by a tilt holding hole 46a, a shock absorbing elongated hole 46b, and a holding portion 46c (see FIGS. 1B and 2B). The tilt holding hole 46a is positioned in a front side end portion of the elongated hole portion 46, while a remaining region of the elongated hole portion 46 is used as the shock absorbing elongated hole 46b. The holding portion 46c is a site for partitioning regions of the tilt holding hole 46a and the shock absorbing elongated hole 46b. More specifically, the holding portion 46c is a shaft piece-shaped member formed to project upward from a lower end of an inner peripheral edge of the elongated hole portion 46, or downward from an upper end.

A pivot shaft 53 to be described below is inserted into the tilt holding hole 46a, and when an impact such as a collision occurs, the pivot shaft 53 to be described below pushes the shaft piece-shaped holding portion 46c over, thereby breaking the holding portion 46c so as to move to the front side of the elongated hole portion 46. A fixing bolt insertion hole 44 is formed in a lower portion of the pivot side portion 41, and a knock pin insertion portion 45 is formed in the rear extension side portion 42 (see FIGS. 2B and 9B).

The knock pin 100, to be described below, is inserted into the knock pin insertion portion 45. The knock pin insertion portion 45 is formed as a through hole in the rear extension side portion 42. Alternatively, the knock pin insertion portion 45 may be formed in a front-rear direction rear end edge of the rear extension side portion 42 in a substantially cutout shape that extends in the front-rear direction or a groove shape that is open to a rear end of the rear extension side portion 42 (see FIGS. 9A and 9B).

Figure 9C:
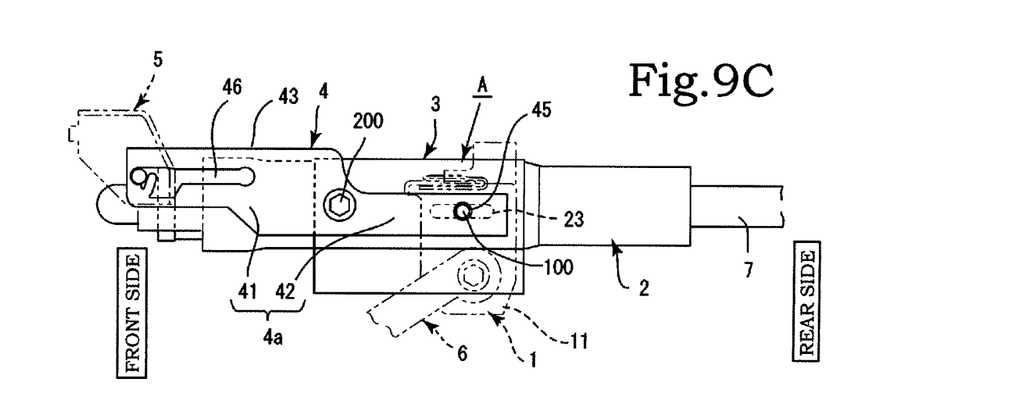
FIG. 9C is a side view showing an embodiment of the present invention using the long type outer column half body and the long type pivot bracket and excluding the fixing bracket.

In the long type pivot bracket 4, the front-rear direction length dimension is greater than that of the short type. More specifically, in the long type, the pivot side portion 41 of the hanging side portion 4a is formed to extend by a greater length than the short type toward the rear side in the front-rear direction. The pivot upper portion 43 is also formed in the region of the rear extension side portion 42 (see FIG. 9B). Further, in a modified example of the long type pivot bracket 4, a similar shape to the short type pivot bracket 4 is employed, but the rear extension side portion 42 is formed to extend by a greater length than the short type toward the rear side and the pivot upper portion 43 is not formed in the region of the rear extension side portion 42 (see FIG. 9C).

Likewise in the long type pivot bracket 4, the elongated hole portion 46 is formed in the pivot side portion 41 of the hanging side portion 4a, the knock pin insertion portion 45 is formed in the rear extension side portion 42, and the fixing bolt insertion hole 44 is formed in either the pivot side portion 41 or the rear extension side portion 42, depending on the position of the screw hole 37 in the outer column half body 3.

As described above, the outer column half body 3 and the pivot bracket 4 both exist in a short type and a long type. These types may be combined freely such that the outer column half body 3 and the pivot bracket 4 are both of the short type or both of the long type. Further, the short type outer column half body 3 may be combined with the long type pivot bracket 4, and the long type outer column half body 3 may be combined with the short type pivot bracket 4.

A lower fixing bracket 5 is fixed to the vehicle body, and the pivot bracket 4 is connected to the lower fixing bracket 5 to be free to rotate (see FIGS. 1A and 2A). The lower fixing bracket 5 is constituted by pivotal connection side portions 52 formed on either width direction side thereof, and attachment fixing portions 51 extending outward in the width direction from upper ends of the respective pivotal connection side portions 52. A support hole portion 52a is formed in the pivotal connection side portion 52, and a fixing hole 51a is formed in the attachment fixing portion 51 to attach the lower fixing bracket 5 to a predetermined location of the vehicle body.

The two pivotal connection side portions 52 sandwich the two pivot side portions 41 of the pivot bracket 4, and the pivotal connection side portion 52 is pivotally connected to the pivot side portion 41 by the pivot shaft 53. The pivot shaft 53 is inserted into the support hole portion 52a of the pivotal connection side portion 52 and connected to the pivot side portion 41 by being inserted into the tilt holding hole 46a. The clamping tool 6 is constituted by a bolt shaft 61, a clamping cam 62, and an operating lever portion 63 (see FIGS. 1A and 1C).

The knock pin 100 is press-fitted into the knock pin attachment hole 38, which is formed to penetrate the holding surface portion 31 and the upper portion contact surface 33 of each outer column half body 3 of the outer column A (see FIGS. 2 and 5A). The knock pin 100 is press-fitted and fixed so as to project from both the upper portion contact surface 33 and the holding surface portion 31. On the holding surface portion 31 side in particular, a tip end of the knock pin 100 projects from the recessed portion 311 to an inner portion side of the holding surface portion 31.

The held cylindrical portion 21 of the inner column 2 is sandwiched between the holding surface portions 31 of the two outer column half bodies 3 of the outer column A. The knock pins 100 projecting from the holding surface portions 31 of the two outer column half bodies 3 are inserted respectively into the telescopic elongated holes 23 formed in the inner column 2 on either width direction side.

When the knock pin 100 is inserted into the telescopic elongated hole 23, rotation of the inner column 2 sandwiched between the two outer column half bodies 3 of the outer column A in an axial circumferential direction is restricted, and rattling in the up-down direction is suppressed (see FIG. 5B). Further, by ensuring that the knock pin 100 contacts an axial direction end portion of the telescopic elongated hole 23, a stroke range can be restricted during telescopic adjustment. Furthermore, the inner column 2 can move in the axial direction along the knock pin 100 inserted into the telescopic elongated hole 23, and therefore axial direction movement thereof during telescopic adjustment can be guided.

Figure 4A:
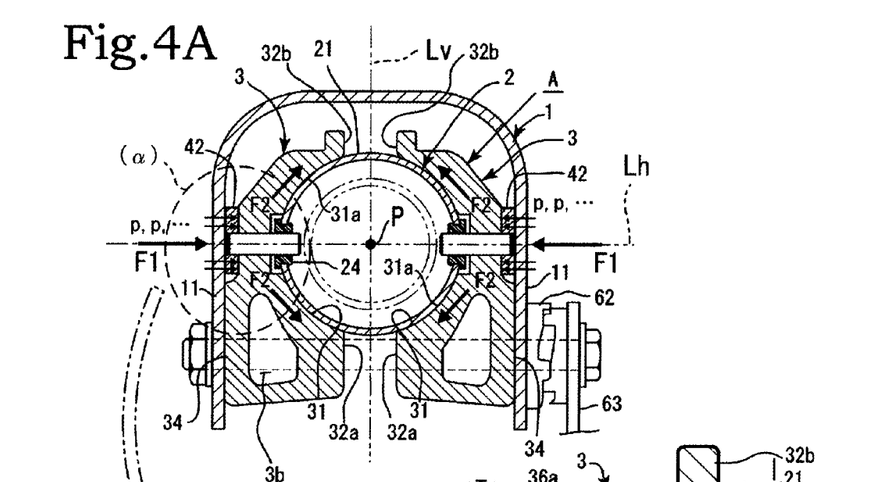
FIG. 4A is a longitudinal sectional front view showing an action of a clamping condition according to the present invention.
Figure 4B:
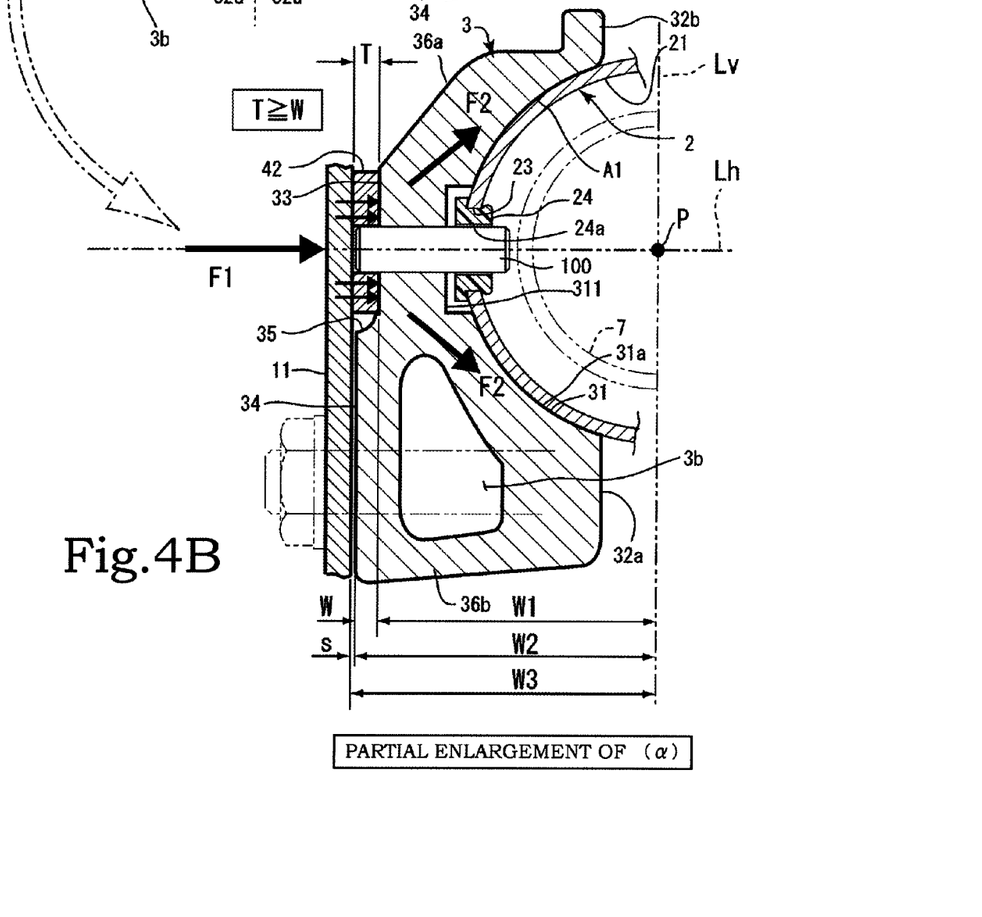
FIG. 4B is an enlarged view of a part (a) of FIG. 4A.

Further, the slide guide 24 is mounted in the telescopic elongated hole 23 of the inner column 2, and an inside tip end of the knock pin 100 is inserted into the telescopic elongated hole 23 via a guide hole 24a formed in the slide guide 24 (see FIGS. 2A and 4). Moreover, the held cylindrical portion 21 of the inner column 2 is formed with a larger inner diameter than other sites so that the steering shaft 7 and the knock pin 100 mounted in the inner column 2 do not come into contact with each other and do not interfere with each other.

The outside surfaces 3a of the two outer column half bodies 3 of the outer column A are sandwiched between the two hanging side portions 4a of the pivot bracket 4, and an outside tip end of the knock pin 100 projecting from the two outside surfaces 3a is inserted into the knock pin insertion portion 45. The two hanging side portions 4a contact the two outside surfaces 3a of the two outer column half bodies 3 substantially in surface contact (see FIGS. 1C, 2A, 3B, 4, and so on).

The two outer column half bodies 3 of the outer column A and the two hanging side portions 4a of the pivot bracket 4 may be assembled using a plurality of constitutions, examples of which are illustrated below, depending on the shape of the outside surface 3a of the outer column half body 3. In a first constitutional example serving as a representative example, the outside surface 3a of the outer column half body 3 is formed in accordance with the first type, i.e. such that the lower portion contact surface 34 projects further outward in the width direction than the upper portion contact surface 33. A combination of the first type and the short type pivot bracket 4 will be described below.

The two upper portion contact surfaces 33 of the two outer column half bodies 3 of the outer column A are sandwiched between the two rear extension side portions 42 of the pivot bracket 4, and the outside tip end of the knock pin 100 projecting from the upper portion contact surface 33 is inserted into the knock pin insertion portion 45. The rear extension side portion 42 contacts the upper portion contact surface 33 substantially in surface contact (see FIGS. 1C, 2A, 3B, 4, and so on).

Hence, the knock pin 100 serves as a positioning member when the outer column A and the pivot bracket 4 are assembled. Further, an amount by which the knock pin 100 projects from the upper portion contact surface 33 is set to be smaller than the thickness dimension T of the rear extension side portion 42 of the pivot bracket 4. In other words, the outside tip end of the knock pin 100 does not project from an outside side face of the rear extension side portion 42. As a result, the outside side face of the rear extension side portion 42 can be used as a sliding surface that slides relative to the fixing bracket 1 during tilt adjustment.

A screw shaft portion of the fixing bolt 200 is inserted into the screw holes 37 formed in the two upper portion contact surfaces 33 and the two fixing bolt insertion holes 44 formed in the two rear extension side portions 42, whereby the pivot bracket 4 is connected fixedly to the outer column half bodies 3 while sandwiching the outer column half bodies 3. The outer column half bodies 3 and the pivot bracket 4 are thus connected integrally, and as a result, a situation in which the left and right outer column half bodies 3 rotate or twist differently during clamping can be prevented, enabling an improvement in clamping force. Further, a length of the screw shaft is set such that the fixing bolt 200 does not project from an inner surface of the recessed portion 311 formed in the outer column half body 3.

The two fixing side portions 11 of the fixing bracket 1 sandwich the rear extension side portions 42 of the pivot bracket 4, which are fixed to the two upper portion contact surfaces 33 of the outer column A, and the lower portion contact surfaces 34, while the bolt shaft 61 of the clamping tool 6 penetrates the clamping bolt shaft insertion hole 39 in the outer column A and the tilt adjustment elongated holes 13 in the fixing bracket 1 (see FIGS. 1A and 1C). Further, the pivot side portions 41 of the pivot bracket 4 are supported by the lower fixing bracket 5.

As described above, the width direction dimension W of the step portion 35 on the outer column half body 3 of the outer column A is equal to or smaller than the width direction thickness dimension T of the rear extension side portion 42 of the pivot bracket 4. In a case where the dimension W is smaller than the thickness dimension T in particular, the rear extension side portions 42 of the two pivot brackets 4 project from width direction outer surface sides of the respective lower portion contact surfaces 34 in the width direction when the rear extension side portions 42 sandwich the upper portion contact surfaces 33 of the two outer column half bodies 3, and a gap S is formed between the fixing side portion 11 and the lower portion contact surface 34 (see FIGS. 3B and 4B).

When a clamping operation is performed using the operating lever portion 63 of the clamping tool 6 such that an interval between the fixing side portions 11 of the fixing bracket 1 narrows, the outer column half bodies 3 of the outer column A attempt to rotate such that an interval between the lower portion inside surfaces 32a narrows and an interval between the upper portion inside surfaces 32b widens.

Since the width direction dimension W of the step portion 35 is formed to be smaller than the width direction thickness dimension T of the rear extension side portion 42, the gap S is formed between the fixing side portion 11 and the lower portion contact surface 34 (see FIGS. 3B and 4B). Accordingly, a dimension W3 from the vertical diameter line Lv to the rear extension side portion 42 in the width direction of the pivot bracket 4 is formed to be larger than a dimension W2 from the vertical diameter line Lv to the lower portion contact surface 34.

Therefore, when clamping is performed using the clamping tool 6, the fixing side portions 11 come into contact with the rear extension side portions 42 before the lower portion contact surfaces 34 due to the gap S, thereby exerting a pressing force F1 thereon. Since the rear extension side portions 42 sandwich the two upper portion contact surfaces 33 of the two outer column half bodies 3 and the two upper portion contact surfaces 33 are formed on an extension line of the horizontal diameter line Lh of the inner column 2, a position where the held cylindrical portion 21 of the inner column 2 intersects the horizontal diameter line Lh is pressed first, and as a result, the outer column half bodies 3 can be prevented from rotating.

Further, the pressing force F1 exerted on the rear extension side portion 42 turns into distributed loads f that are transmitted to the upper portion contact surface 33 with a favorable balance such that an even clamping force F2 is exerted on the inner column 2 (see FIG. 4). In other words, the pressing force F1 is dispersed evenly between the holding surface portion 31 in a region above the recessed portions 311 and the holding surface portion 31 in a region below the recessed portions 311, and as a result, rotation of the outer column half bodies 3 of the outer column and rattling can be prevented.

Moreover, the step portion 35 may not be formed on the outer column half bodies 3. In this case, similar effects to those obtained when the step portion 35 is formed on the outer column half bodies 3 can be obtained by disposing a spacer or the like between the two lower portion contact surfaces 34 and the fixing side portions 11 or forming a projecting portion that projects from the inside surface of the fixing side portions 11 by pressing or the like. A thickness dimension of the spacer and the projecting portion is set to be equal to or smaller than the width direction thickness dimension T of the rear extension side portions 42.

Furthermore, when the long type outer column half bodies 3 are used, the two hanging side portions 4a of the pivot bracket 9, which sandwich the two outside surfaces 3a of the two outer column half bodies 3, and the two fixing side portions 11 of the fixing bracket 1 do not overlap (see FIG. 8A). In other words, the fixing side portions 11 are structured to sandwich the two outside surfaces 3a of the two outer column half bodies 3 directly. In this case, a gap is formed between the upper portion contact surfaces 33 of the outer column half bodies 3 and the fixing side portions 11, and therefore a spacer or the like is mounted in the gap.

By forming the outside surface 3a of the outer column half body 3 in accordance with the third type, i.e. such that the upper portion contact surface 33 and the lower portion contact surface 34 are coplanar, in a case where the two hanging side portions 4a of the two pivot brackets 4 do not overlap the two fixing side portions 11 of the fixing bracket 1, the aforesaid spacer or the like becomes unnecessary (see FIG. 10B). Further, the two hanging side portions 4a of the pivot bracket 4 may be caused to contact the two upper portion contact surfaces 33 and the two lower portion contact surfaces 34 of the two outer column half bodies 3 so as to sandwich the upper portion contact surfaces 33 and lower portion contact surfaces 34.

Furthermore, the two hanging side portions 4a of the pivot bracket 4 may be caused to contact the two lower portion contact surfaces 34 of the two outer column half bodies 3 so as to sandwich the lower portion contact surfaces 34. In this case, the outside surfaces 3a of the outer column half bodies 3 are formed in accordance with the second type, i.e. such that the upper portion contact surface 33 projects further outward in the width direction of the outer column half body 3 than the lower portion contact surface 34 (see FIG. 10A).

The width direction dimension W of the step portion 35 according to the second type is preferably formed to be larger than the width direction thickness dimension T of the rear extension side portion 42. During clamping using the clamping tool 6, the fixing side portions 11 come into contact with the upper portion contact surfaces 33 before the rear extension side portions 42 of the pivot bracket 4, which sandwich the two lower portion contact surfaces 34 of the outer column half bodies 3, and therefore the outer column half bodies 3 can be prevented from rotating.

The screw hole 37 and the knock pin attachment hole 38 are formed in the outer column half body 3 to penetrate the inside holding surface portion 31 and the outside upper portion contact surface 33. The screw hole 37 is formed in the front side, and the knock pin attachment hole 38 is formed in the rear side. Further, the screw hole 37 is formed with an inner screw.

As described above, by clamping both the rear extension side portions 42 of the pivot bracket 4 and the outer column half bodies 3 of the outer column A with the fixing side portions 11, the inner column 2 can be clamped not only from the lower portion contact surfaces 34 of the outer column half bodies 3 of the outer column A, but also from the upper portion contact surfaces 33 via the pivot bracket 4, and as a result, an improvement in clamping rigidity is achieved.

Furthermore, the recessed portions 311 are formed in respective up-down direction intermediate locations in the holding surface portions 31 of the two outer column half bodies 3 of the outer column A. Hence, the inner column 2 is clamped fixedly by a total of four surfaces, namely the regions of the holding surface portions 31 on the upper side of the recessed portions 311 and the regions of the holding surface portions 31 on the lower side of the recessed portions 311, and as a result, an improvement in clamping rigidity is achieved.

Moreover, the pivot bracket 4 serves as a return spring that deflects during clamping such that the interval between the two rear extension side portions 42 narrows and returns to its original shape when the clamp is released. Hence, the pivot bracket 4 assists separation of the outer column half bodies 3 so that the clamp on the inner column 2 is released smoothly.

By causing the pivot bracket 4 to serve as a return spring during clamp release, separation of the two lower portion inside surfaces 32*a* of the outer column is assisted, and therefore the clamp on the inner column 2 can be released smoothly. FIG. 4A shows a condition in which the fixing side portion 11 has deflected due to clamping so as to contact the lower portion contact surface 34 of the outer column half body 3, while FIG. 4B shows a condition in which the fixing side portion 11 has not yet deflected and is not therefore in contact with the lower portion contact surface 34 of the outer column half body 3.

Figure 6:
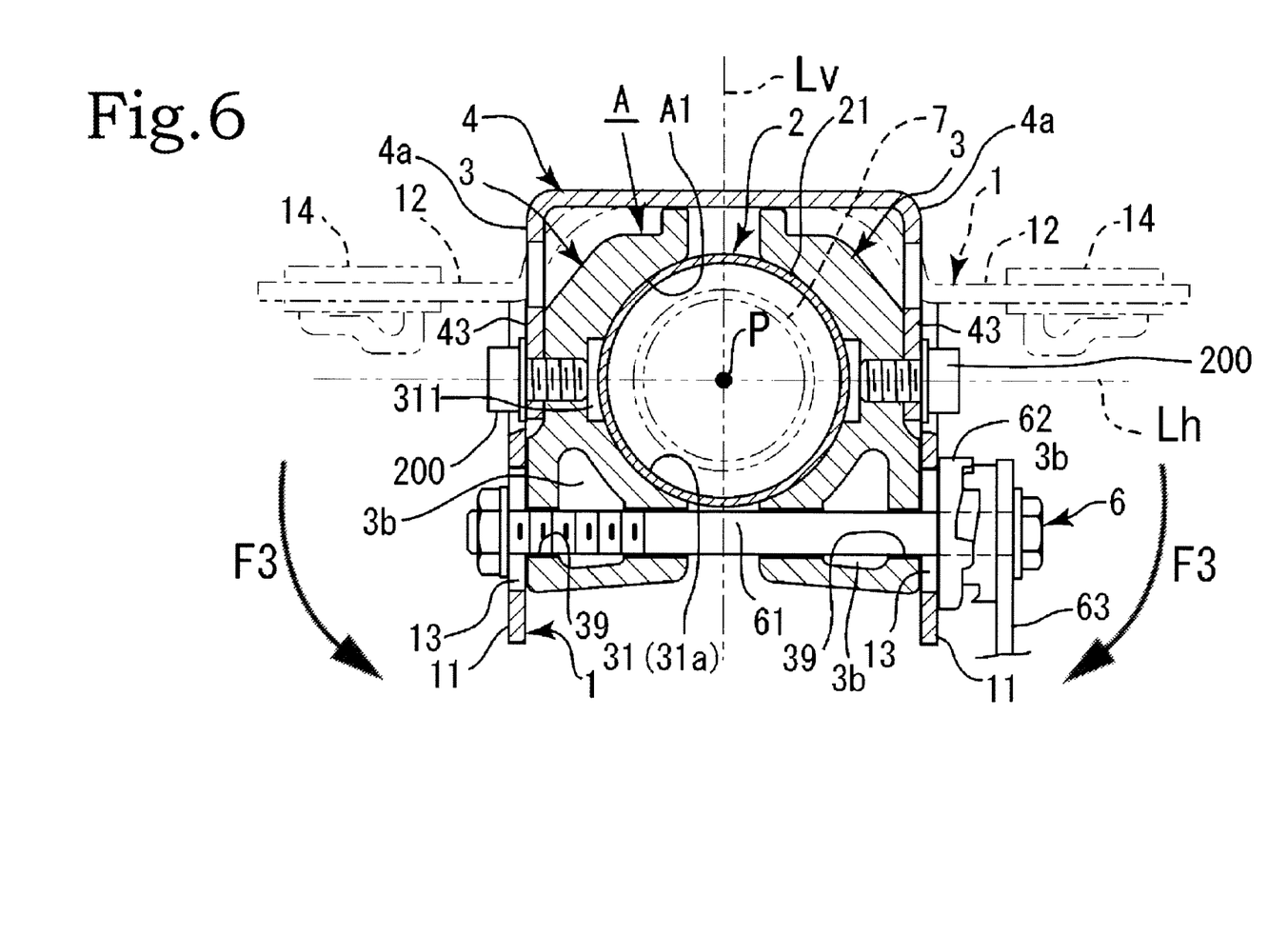
FIG. 6 is a longitudinal sectional front view showing an embodiment of the present invention in which a pivot upper portion of the pivot bracket contacts an upper end of each of two outer column half bodies.
Figure 7:
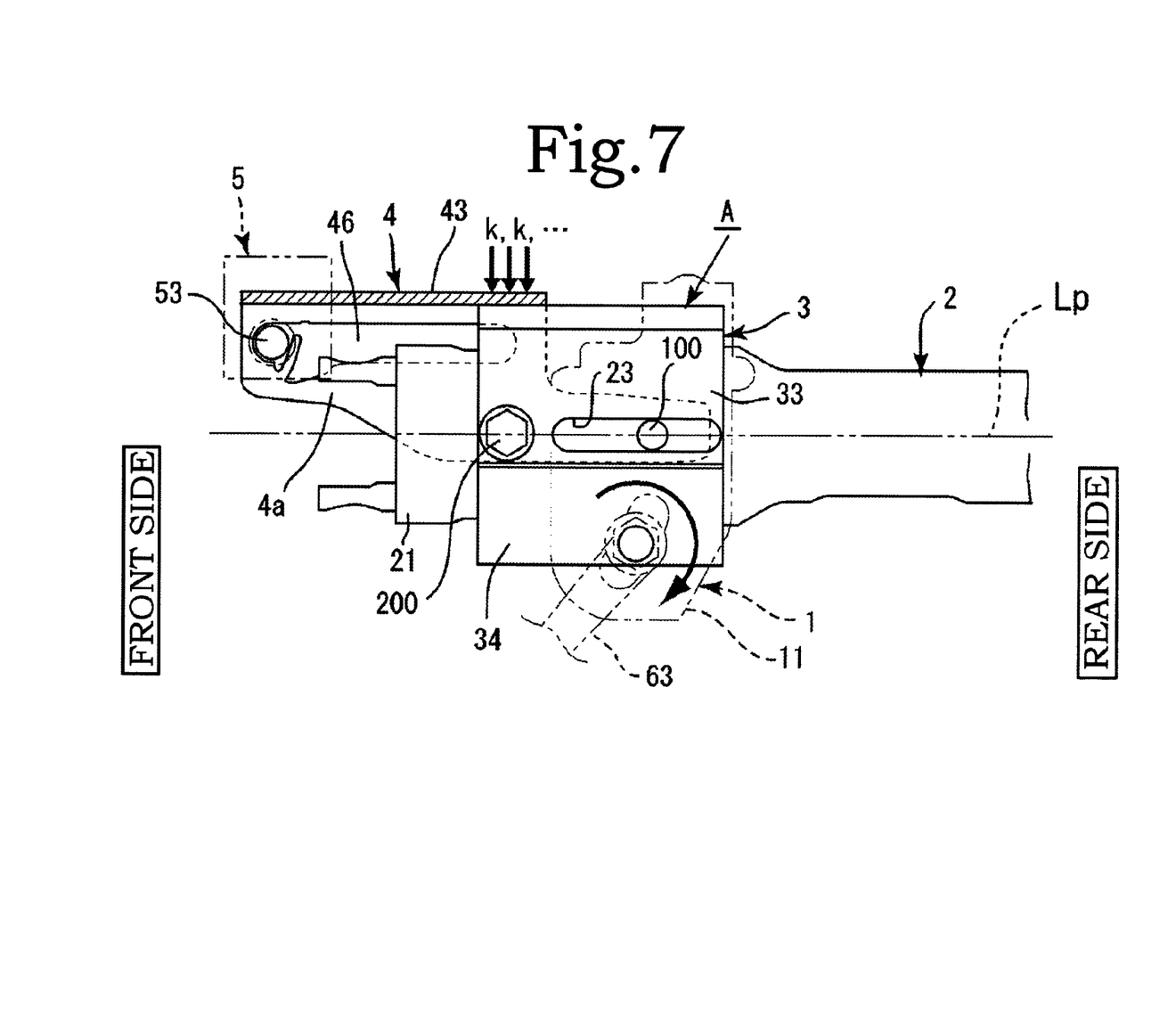
FIG. 7 is a partial sectional view showing an embodiment of the present invention in which the pivot upper portion of the pivot bracket contacts the upper end of each of the two outer column half bodies, and a longitudinal sectional side view showing a condition excluding the fixing bracket.

The pivot upper portion 43 of the pivot bracket 4 may be constituted to contact an upper end of each of the two outer column half bodies 3 of the outer column A (see FIGS. 6 and 7). The upper end of the outer column half body 3 is an uppermost end position of the outer column half body 3, and corresponds to an upper end of the upper surface portion 36*a*.

When the operating lever portion 63 is swung in a clamping direction during clamping using the clamping tool 6, a rotary force F3 is exerted on the two outer column half bodies 3 (see FIG. 6) such that the two outer column half bodies 3 attempt to rotate. However, the upper end of each of the two outer column half bodies 3 contacts the pivot upper portion 43 so that when the outer column half bodies 3 attempt to rotate, reaction forces k are generated in the pivot upper portion 43 by the rotary force F3.

The reaction forces k press the upper end of each of the outer column half bodies 3, and therefore the outer column half bodies 3 can be prevented from rotating even more forcefully (see FIG. 7). Hence, the interval between the two outer column half bodies 3 can be narrowed evenly, and as a result, the inner column 2 can be clamped (locked) from either width direction side with stability. Moreover, positional deviation in the diametrical center P of the inner column 2 can be suppressed, whereby strong clamping rigidity can be obtained.

The axial direction length of a required steering device normally varies according to a vehicle body layout and a vehicle type. With the steering device structure according to the present invention, a steering column device having a desired length can be obtained simply by modifying the axial direction length of the pivot bracket 4 or the outer column A. Further, the outer column A is made of an aluminum alloy and constituted by the two outer column half bodies 3 forming a left-right pair, and therefore only a single die is required for the outer column half body 3, enabling a further reduction in cost.

Particularly in a case where the outer column half bodies 3 are formed by aluminum extrusion molding, steering column devices of various lengths, such as the short type and the long type, can be obtained simply by cutting the outer column half bodies 3 to a desired length, i.e. without the need to manufacture a new die. Hence, steering devices for various vehicle types can be manufactured using a single die, enabling a reduction in cost. Moreover, processing is not required on tilt sliding surfaces of the outer column half bodies 3 and the holding surface portion 31, enabling a further reduction in cost.

Further, a punched portion 3*b* may be formed in the outer column half body 3 between the lower portion contact surface 34 and the lower portion inside surface 32*a* so as to penetrate in the axial direction. By forming the punched portion 3*b*, the outer column half body 3 can be reduced in weight without decreasing in rigidity (see FIGS. 2B, 3, and so on). The present invention is not to be interpreted as being limited to the embodiments described above, and appropriate modifications and amendments may be implemented on the embodiments.

What is claimed is:

1. A steering device comprising:
    an inner column;
    an outer column that includes a left-right pair of outer column half bodies having holding surface portions formed on respective inner surface sides thereof, the two holding surface portions constituting a holding inner peripheral surface for holding an outer peripheral surface of the inner column;
    a pivot bracket in which hanging side portions are formed on either width direction side of a pivot upper portion;
    a fixing bracket provided with fixing side portions on either width direction side; and
    a clamping tool,
    wherein respective width direction outside surfaces of the two outer column half bodies are sandwiched between the two hanging side portions of the pivot bracket, and the two fixing side portions of the fixing bracket are connected such that the two width direction outside surfaces of the two outer column half bodies can be clamped and released by the clamping tool, and
    wherein each of the hanging side portions comprises a pivot side portion and a rear extension side portion that projects to a rear side from the pivot side portion,
    the outside surfaces of the two outer column half bodies each include an upper portion contact surface formed in a position corresponding to a diametrical center of the held inner column so as to extend in an axial direction, and a lower portion contact surface formed below the upper portion contact surface,
    the two upper portion contact surfaces are sandwiched fixedly between the two rear extension side portions of the pivot bracket,
    the two rear extension side portions are sandwiched between the two fixing side portions of the fixing bracket, and
    the two fixing side portions are connected to the two lower portion contact surfaces such that the two lower portion contact surfaces can be clamped and released via the clamping tool.

2. The steering device according to claim 1, wherein the lower portion contact surface is formed to project further outward in the width direction than the upper portion contact surface via a step portion, and
    a width direction dimension of the step portion is formed to be equal to or smaller than a thickness dimension of the rear extension side portion of the pivot bracket.

3. The steering device according to claim 1, wherein a groove-shaped recessed portion is formed in an up-down direction intermediate location in the holding inner peripheral surface of the outer column so as to extend in an axial direction.

4. The steering device according to claim 1, wherein a knock pin is inserted fixedly into the upper portion contact surface of the outer column and the rear extension side portion of the pivot bracket, and
    a telescopic elongated hole for inserting the knock pin is formed in the inner column so as to extend in an axial direction.

5. The steering device according to claim 1, wherein each of the holding surface portions is formed in a semicircular shape such that the two holding surface portions together constitute a circular-shaped holding inner peripheral surface.

6. The steering device according to claim 1, wherein each of the holding surface portions is formed in a polygonal surface shape such that the two holding surface portions together constitute a polygonal holding inner peripheral surface.

7. The steering device according to claim 1, wherein the pivot upper portion of the pivot bracket contacts an upper end of each of the two outer column half bodies.

8. The steering device according to claim 1, wherein the two outer column half bodies comprise an aluminum alloy.

9. The steering device according to claim 1, wherein the lower portion contact surface is formed to project further outward in the width direction than the upper portion contact surface via a step portion, and
a width direction dimension of the step portion is formed to be equal to or smaller than a thickness dimension of the rear extension side portion of the pivot bracket.

10. The steering device according to claim 1, wherein a groove-shaped recessed portion is formed in an up-down direction intermediate location in the holding inner peripheral surface of the outer column so as to extend in an axial direction.

11. The steering device according to claim 1, wherein a knock pin is inserted fixedly into the upper portion contact surface of the outer column and the rear extension side portion of the pivot bracket, and
a telescopic elongated hole for inserting the knock pin is formed in the inner column so as to extend in an axial direction.

12. The steering device according to claim 1, wherein each of the holding surface portions is formed in a semicircular shape such that the two holding surface portions together constitute a circular-shaped holding inner peripheral surface.

13. The steering device according to claim 1, wherein each of the holding surface portions is formed in a polygonal surface shape such that the two holding surface portions together constitute a polygonal holding inner peripheral surface.

14. The steering device according to claim 1, wherein the pivot upper portion of the pivot bracket contacts an upper end of each of the two outer column half bodies.

15. The steering device according to claim 1, wherein the two outer column half bodies comprise an aluminum alloy.

* * * * *